July 6, 1965  K. E. WILHELM  3,193,086
BELT TRAINING IN CONVEYOR SYSTEMS
Filed June 27, 1961  2 Sheets-Sheet 1

INVENTOR
Kurt E. Wilhelm

BY Irons, Birch, Swindler & McKie
ATTORNEYS

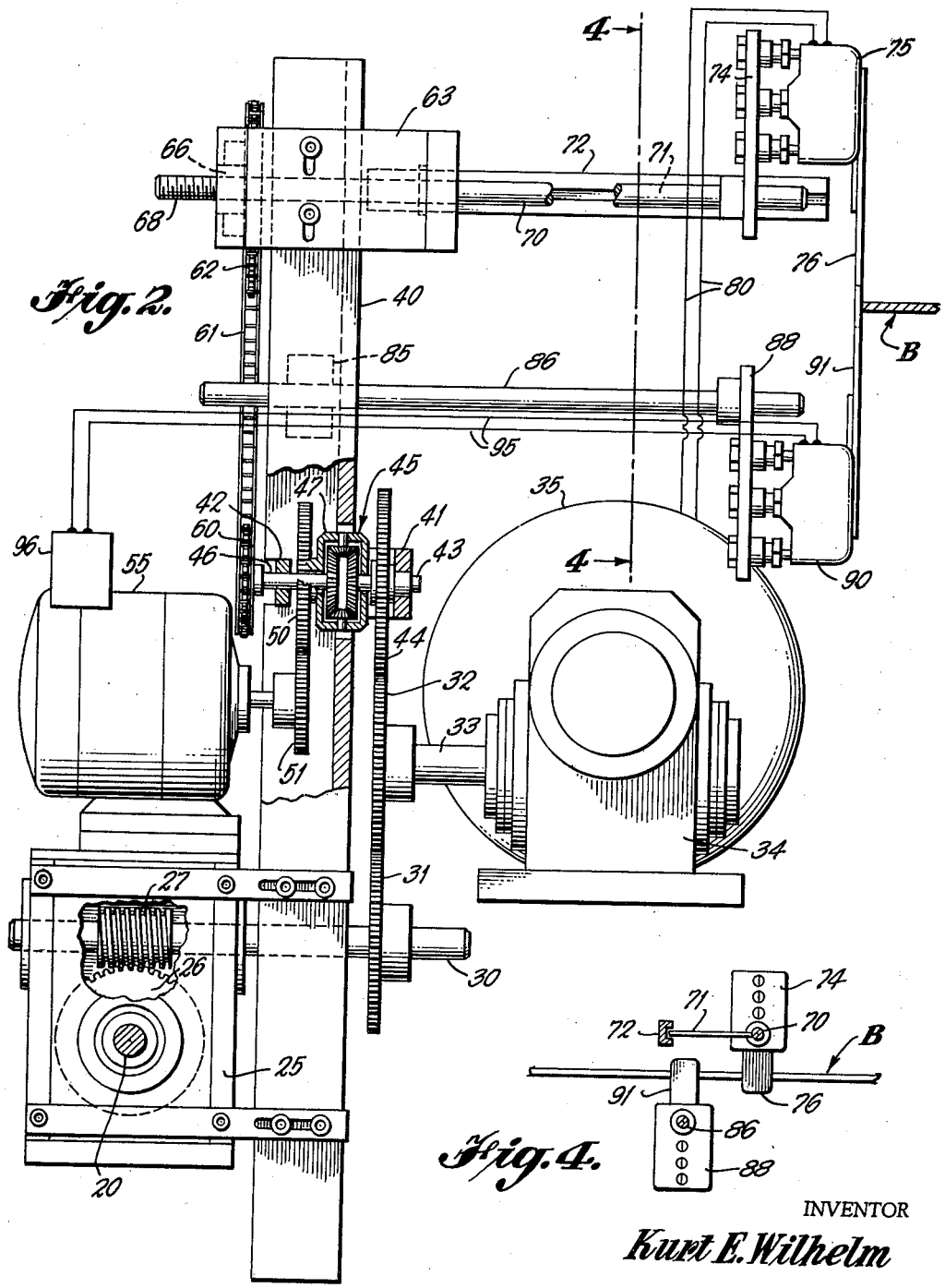

United States Patent Office

3,193,086
Patented July 6, 1965

3,193,086
BELT TRAINING IN CONVEYOR SYSTEMS
Kurt E. Wilhelm, Barrington, R.I., assignor to Rohm & Haas Company, Philadelphia, Pa., a corporation of Delaware
Filed June 27, 1961, Ser. No. 119,966
4 Claims. (Cl. 198—202)

This invention relates generally to the art of belt conveyors and more specifically is directed to controlling the passage of a belt over the bend pulley in a conveyor system to maintain the belt trained across the central portion of such pulley. The invention finds particular application in conjunction with belt conveyor systems employing a steel band belt which is trained across the bend pulleys disposed at the head and foot terminals of the conveyor system.

In some belt conveyor installations, particularly where the conveyor belt must pass through highly heated areas, the use of the more well known flexible resilient belting materials is not possible. Therefore, steel band belts which can withstand the high temperature conditions encountered in passing through a heat area are used. The steel band belting is generally of relatively thin carbon or stainless strip steel which is alloyed and heat treated to withstand the continuous flexing occurring in passing over the bend pulleys at the head and foot terminals of the conveyor system. One application which may be mentioned as requiring the use of steel band belting is in connection with conveyors employed to convey extruded latex thread through the long, high temperature curing tunnels employed in the production of such thread.

Factors such as lack of resiliency and the effect of temperature changes to which the steel band belt may be exposed to in use contribute to the problem of maintaining the belt properly trained over the bend pulleys. By its nature, the steel band belt must be maintained to provide a flat conveyong surface and thus cylindrical bend pulleys are required at the head and foot terminals of the conveyor system. As the steel belt passes through a heating zone, localized heating and cooling of portions of the belt may occur which will cause localized expansion and contraction longitudinally of the belt thereby setting up stresses on the conveyor system which can have the effect of starting the belt to shift or walk laterally along the bend pulley.

Additionally the difficulties in forming a perfect steel band belt can create problems in maintaining the belt properly trained over the bend pulleys. These difficulties may be described in relation to production of the relatively thin carbon or stainless strip steel. Despite careful control in the steel rolling operation, these invariably results a certain degree of camber along the length of the steel strip which is to be jointed at its ends in forming the belt. This camber will show up by a degree of convexity of the longitudinal edge of the steel strip as reflected by the fact that a straight edge or straight line extending along the edge between the end corners of the strip will not coincide along its length with the edge of the strip. In a belt of several hundred feet in length, this camber may amount to as much as two or three inches departure from a straight reference line.

A second difficulty in forming a theoretically perfect steel band belt arises in connection with joining the ends of the steel strip. If the ends to be joined are not perfectly squared, they will, when united, form a belt in which the portions of the steel strip on opposite sides of the joint will not extend in true longitudinal alignment with each other.

The defects which tend to result in belts that are not theoretically perfect increase the difficulty of maintaining such a belt properly trained over the band pulleys of the conveyor system. As the width of the belt increases, and belts of several feet in width are not uncommon, the lack of resiliency and reaction to temperature changes become greater problems in maintaining training of the belt across the bend pulleys. The difficulties in these areas may be more readily appreciated when it is realized that conveyor systems with these relatively wide steel band belts passing through elongated high temperature tunnels, may be 300 feet in length involving a belt formed from a thin steel strip 600 feet in length.

The seriousness of failure to maintain the belt trained over the bend pulleys is pointed up by the substantial cost per square yard of the stainless strip belting which may be completely destroyed should the belt shift laterally on the bend pulleys and engage with the mountings of the pulleys or other stationary parts adjacent the lateral edges of the belt. With currently available belt training controls it has been found necessary in the longer steel band conveyor systems to maintain a training control at each end of the system, and even with this degree of training control, the wider belts may shift on the belt pulleys damaging the belt involving loss of the costly belt and long and expensive down time of the equipment for repair of the system.

The instant invention has as a principal object the provision of an improved method and apparatus wherein the training position of the belt relative to the bend pulley is sensed and this indicator employed to effectively maintain the belt on the central portion of the pulley irrespective of conditions to which the belt is subjected tending to shift the belt laterally of such pulley.

Another important object of the instant invention resides in providing an improved conveyor belt control device and method of maintaining a conveyor belt trained over the bend pulley wherein shifting of the belt from a mistrained position to its proper position trained over the central portion of the bend pulley is anticipated to preclude excessive correction for the mistraining condition of the belt.

A further object of the instant invention is to provide a conveyor belt control device for swinging the bend pulley axis to control training of the belt over the central portion of such pulley wherein relatively small corrective action is applied by the swinging of such pulley axis for each cycle of belt travel over the pulley as such cycle is represented by the full length of the belt passing over the pulley and with the total corrective action of a series of cycles being effective by their cumulative effect to maintain the belt at its proper trained position relative to the bend pulley.

The above and other objects and novel features of the instant invention will be readily apparent from the following description taken in connection with the accompanying drawings. It is to be expressly understood that the drawings are for the purpose of illustration and are not intended to define the limits of the invention but rather to merely illustrate a preferred embodiment and structure incorporating features of the instant invention and for carrying out the method of the invention.

In the accompanying drawings forming a part of this specification and wherein like reference numerals are employed to define like parts:

FIGURE 2 is a view taken on line 2—2 of FIGURE 1 with parts broken away and shown in section;

FIGURE 4 is a view taken on line 4—4 of FIGURE 2.

Figure 1:
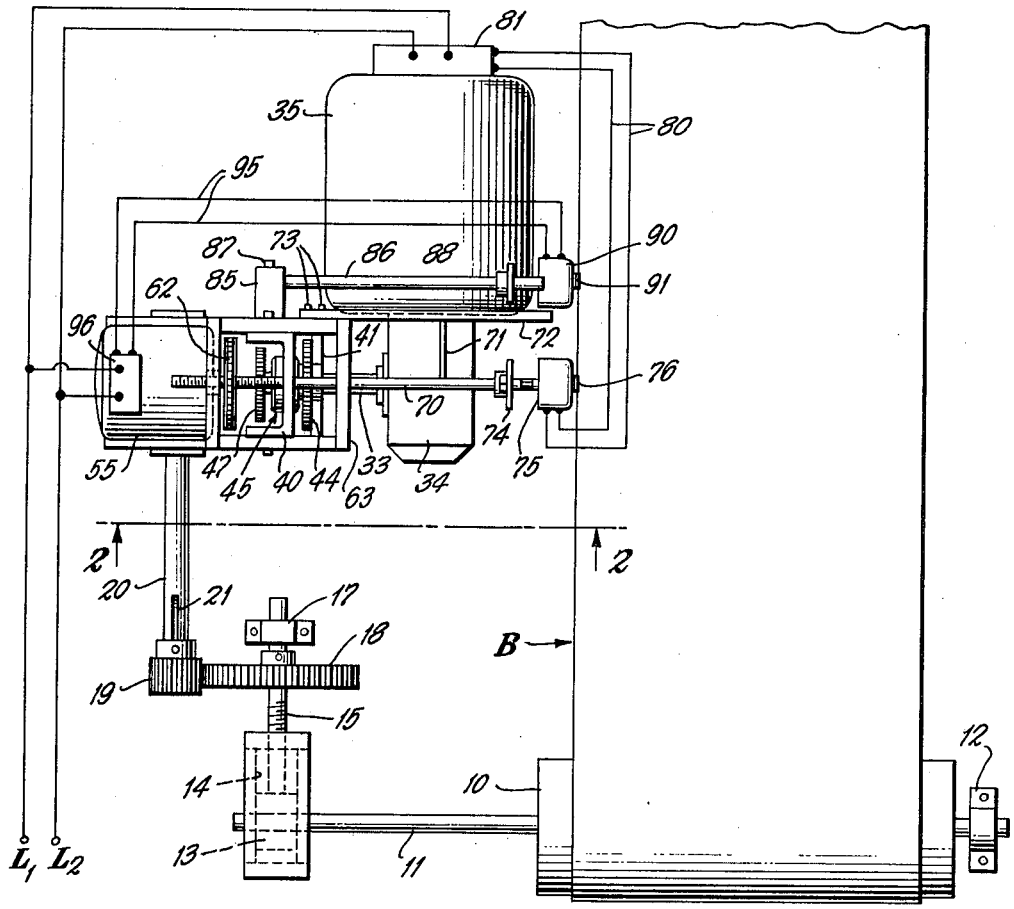
FIGURE 1 is a plan view showing the controller device of the instant invention associated with a bend pulley of a conveyor system.

The overall relationship of the belt control device to a conveyor system and manner in which the method of the instant invention may be carried out can best be understood by reference to FIGURE 1. On this figure, a portion of a steel band belt B is illustrated passing over the bend pulley 10 at one terminal of a conveyor system. It will be appreciated that the other end of the belt will pass over the bend pulley at the other terminal. As may be necessary, particularly in connection with relatively long conveyor systems, the bend pulleys at both the head and foot terminals of the conveyor system may be provided with a belt training control device in accordance with the instant invention.

The bend pulley 10 provides a cylindrical surface around which the belt B is trained with the upper run of the belt providing a conveying surface and the lower run constituting the return of the belt. The belt pulley 10 is mounted on a shaft 11 rotatably supported at one end in a bearing block 12 and in a movable bearing 13 at its opposite end. The belt is driven as by a suitable drive means (not shown) connected to drive the shaft of the bend pulley at the terminal ends of the conveyor system. The bearing block 12 is constructed to permit limited swinging of the axis of shaft 11 in a plane generally parallel to the supporting surface of belt B. Although as will be explained, this swinging of the pulley axis is sufficient to shift the belt laterally of the bend pulley as it passes thereover while being driven, the extent of swing is not so great as to seriously interfere with the shaft mounting bearing or drive means which may be connected to drive the bend pulley shaft.

The bearing 13 is slidable in a slide 14 with the axis of slide 14 disposed normal to the axis of shaft 11. An actuating screw 15 threadably engages through one end of the housing of slide 14 with its end pressing the exterior of bearing 13. The tension of belt B on bend pulley 10 maintains bearing 13 in engagement with the end of screw 15. Depending upon the direction of rotation of screw 15, the bearing 13 will be moved along slide 14 to swing the shaft axis about its end mounted in bearing block 12.

Screw 15 has a shaft portion mounted in bearing 17 with a gear 18 fixed to this shaft portion. A pinion 19 drivingly engages with gear 18 and is mounted on a shaft 20, by rotation of which the screw 15 may be driven to swing the shaft 11.

At this point, the manner in which belt B is shifted laterally on bend pulley 10 may best be described. With belt B being driven and training over the central portion of bend pulley 10, the axis of shaft 11 will, in theory, be disposed perpendicular to the longitudinal path of the belt. However, band conditions may be such that as the belt passes over the pulley 10 in operation of the system, the belt will tend to shift laterally from the proper trained position.

In the event that the conditions causing the belt to shift result in its moving laterally toward the right end of shaft 11 as shown in FIGURE 1, corrective action to oppose this shift and return the belt to its proper trained position will be obtained by swinging shaft 11 about bearing block 12 in a clockwise direction, this movement being achieved by rotating screw 15 to permit bearing 13 to move upwardly in slide 14 with the belt tension continuously maintaining bearing 13 against the end of screw 15. Should the belt shift to the left on pulley 10, the corrective action called for will necessitate swinging shaft 11 counter-clockwise about block 12 as shown in FIGURE 1, this action being obtained by reverse rotation of screw 15 to force block 13 down in slide 14.

It may be noted that shaft 20 is provided with an elongated keyway 21 with which the pinion 19 may be keyed to be driven by shaft 20. It is advantageous to have the pinion 19 mounted on shaft 20 such that it may be moved axially of the shaft out of engagement with gear 18. Thus should an emergency arise dictating that adjustment of the position of shaft 11 be carried out this may be done by manually rotating screw 15.

The manner of reversingly driving the shaft 20 which through pinion 19 and gear 18 rotates screw 15 may now be described. As shown on FIGURE 2, shaft 20 connects with a speed reducer 25 having a worm gear 26 driven by a worm 27, with gear 26 secured to drive shaft 20 and worm 27 affixed on a shaft 30. Shaft 30 carries a gear 31 which meshes with a gear 32 carried on the output shaft 33 of a speed reducer 34.

A motor 35 is connected to the input of speed reducer 34 to effect driving of shaft 33. The motor 35 is reversible such that the direction of rotation of gear 32 may be reversed as necessary in connection with carrying out corrective action for training the belt. It will be readily appreciated that through the gearing described above, the direction of rotation of motor 35 will determine the direction of rotation of screw 15. Thus, by energizing motor 35 to rotate in one direction or the other swinging of shaft 11 to obtain the required shifting of the belt may be effected to maintain the belt properly trained on belt pulley 10.

A frame 40 mounts the speed reducer 25 in relation to the drive gear 32 driven by motor 35 and provides bearing supports 41 and 42. A shaft 43 is rotatably mounted in bearing support 41 and has secured thereto a gear 44 which meshes with gear 32. Shaft 43 is connected through the gearing of a differential 45 to an output shaft 46 rotatably mounted in bearing support 42.

The differential 45 which is shown in section may take a variety of forms. As illustrated, it embodies bevel gears on the adjoining ends of shafts 43 and 46 within the housing 47 of the differential. The housing carries stub shafts on which beveled pinions are rotatably mounted, these pinions meshing between the bevel gears on the shafts 43 and 46. The differential housing 47 is rotatable relative to shafts 43 and 46 and has connected thereto a gear 50 which meshes with a gear 51 mounted on the drive shaft of motor 55.

With the housing 47 of differential 45 held stationary, the input rotation of shaft 43 will be directly transmitted to output shaft 46 through rotation of the bevel pinions on housing 47. With shaft 43 stationary and the housing 47 rotated by motor 55 driving through gears 51 and 50, the output shaft 46 will rotate with the housing 47 as the bevel pinions carried by such housing roll around the perimeter of the bevel gear on shaft 43. When both gears 44 and 50 are driven by the motors 35 and 55 respectively, the rotational speed of output shaft 46 will reflect either a summation of the rotative inputs of gears 44 and 50 or the difference between the rotative inputs of these gears depending upon the direction of rotation of each of these gears as determined by the direction of rotation of the respective motors 35 and 55.

Figure 3:
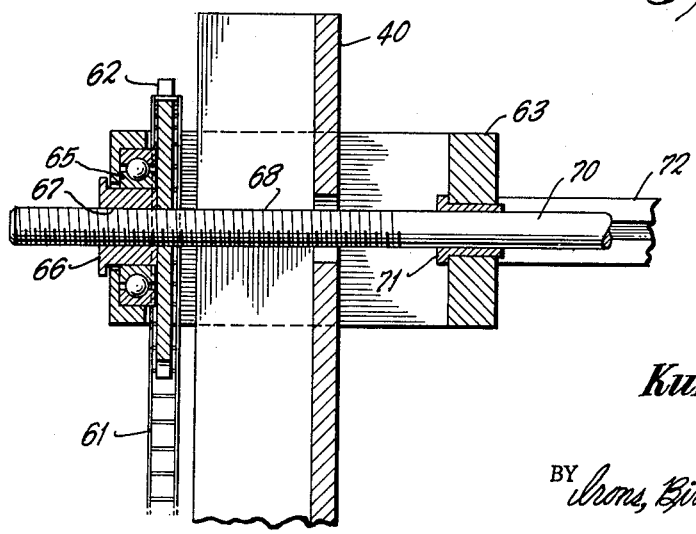
FIGURE 3 is a detailed sectional view.

Output shaft 46 carries a sprocket 60 which is coupled through a drive chain 61 with a sprocket 62 rotatably mounted on a holder 63 secured to the upper end of frame 40. The mounting of sprocket 62 on holder 63 is best shown in the sectional view of FIGURE 3. As illustrated thereon, the sprocket is rotatably supported by a ball bearing 65, the outer race of which is fixed in holder 63 with the inner race fixed on hub 66 to sprocket 62. The hub 66 provides an internally threaded bore 67 which engages with threads 68 on rod 70. Rod 70 passes through a bearing 71 carried in holder 63 and extends outwardly toward the edge of belt B as shown in FIGURES 1 and 2.

Rod 70 carries a guide pin 71 which engages in the longitudinal groove of a guide 72 which guide is fixed at 73 to the side of holder 63. Engagement of pin 71 with the guide 72 precludes rotation of rod 70 such that rotation of sprocket 62 will by engagement of threads 67 and 68 move the rod 70 axially in one direction or the other depending upon the direction of rotation of sprocket 62.

Rod 70 has a switch holder plate 74 fixed thereto with a switch 75 mounted on plate 74. The flexible switch operator 76 extends downwardly and is disposed to engage the edge of belt B. The switch 75 has two actuated conditions with operator 76 being biased outwardly toward engagement with belt B such that as the belt shifts laterally on the bend pulley 10, the switch 75 will be operated from one actuated condition to the other.

The switch 75 is connected by leads 80 to a control box 81 mounted on motor 35 (see FIGURE 1). Power is supplied to the motor 35 from lines $L_1$ and $L_2$, these lines connecting to control box 81 as shown in FIGURE 1.

The connections for leads 80 to switch 75 and with appropriate control circuits within box 81 are such that in one actuated condition of switch 75, the motor 35 will be energized to rotate in one direction while in the other actuated condition of switch 75 the motor 35 will be energized to rotate in the opposite direction. It is important to note therefore that the motor 35 is energized to be driven in one direction or the other at all times, since, with the motor 35 driving in one direction when belt B shifts to change the actuated condition of switch 75, the result of such change causes the motor to reverse its direction of rotation.

Frame 40 carries a mounting bracket 85 which supports a rod 86 fixed in the bracket by a set screw 87. Rod 86 has a switch holder plate 88 fixed thereto which plate mounts a switch 90. The flexible switch operator 91 of switch 90 extends upwardly to be disposed adjacent the edge of belt B spaced a short distance longitudinally of the belt as shown in FIGURES 1 and 4. Leads 95 extend from switch 90 to a control box 96 on motor 55. Power is supplied to motor 55 through box 96 from lines $L_1$ and $L_2$ as shown on FIGURE 1.

The switch 90 is similar to switch 75 and is connected through leads 95 to and with control circuits within the control box 96 so that it will control the direction of rotation of motor 55. Thus, switch 90 has two actuated conditions with the switch operator 91 being biased toward the edge of belt B. As the belt shifts laterally on bend pulley 10, the switch 90 is operated between the two actuated conditions with one condition causing driving of motor 55 in one direction and the other condition causing driving of the motor in the opposite direction.

Having described the structure of the belt training control device, its operation and the method of training control of the invention may be set forth. The motor 35 drives screw 15 to swing the axis of bend pulley 10 and thereby cause belt B to shift toward one end or the other of the bend pulley.

Referring to FIGURE 1, if belt B shifts to the left on pulley 10, switch 75 will be in an actuated condition to energize motor 35 in a direction which rotates screw 15 such that shaft 11 will be swung in a counterclockwise direction relative to bearing block 12. If belt B shifts to the right on pulley 10, switch 75 will be operated to its other actuated condition whereupon motor 35 will rotate in a reverse direction and reverse rotation of screw 15 will permit shaft 11 to swing in a clockwise direction. Thus the change over point of switch 75 i.e., the point at which it changes from one actuated condition to its other actuated condition, defines a "control point" laterally movable relative to the edge of belt B.

The above description of the control effected by switch 75 ignores the movable mounting which changes the control point at which switch 75 is operated from one actuated condition to the other. This moving of the control point thereby changes the control effect on motor 35. With the edge of belt B having a predetermined relation to the control point at the change over position of switch 75, whenever the edge is disposed in one direction from this predetermined relation motor 35 will operate in one direction and whenever the edge is disposed in the other direction from this predetermined relation motor 35 will operate in the other direction.

The control point provided by the switch 75 is movable by reason of this switch being mounted on rod 70 which shifts axially depending upon the direction of rotation of sprocket 62. Assuming for the moment that motor 55 is not energized so that the housing 47 of differential 45 is stationary, the operations of motor 35 drive the sprocket 62 through chain 61, sprocket 60, shaft 46, the bevel gearing in differential 45, shaft 43 and gear 44.

As noted above, with belt B shifting to the left on pulley 10, motor 35 under the control of switch 75 drives screw 15 to swing shaft 11 counter-clockwise. While rotating in this direction, motor 35 also drives the sprocket 62 in a direction to withdraw switch 75 on rod 70 away from the edge of belt B which, in these circumstances, is holding switch 75 in one actuated condition. Still assuming that motor 55 is stationary, if belt B is shifting to the right on pulley 10, motor 35 is operating in a direction to rotate screw 15 to permit the axis of pulley 10 to swing in a clockwise direction. While rotating in this direction, motor 35 also drives sprocket 62, this time in a direction to move switch 75 on rod 70 toward the edge of belt B since the edge of the belt under these conditions is positioned so that switch 75 is in its other actuated condition.

It will thus be appreciated that the rotation of motor 35 in applying a corrective action by swinging the axis of the bend pulley 10 at the same time moves the control point provided by switch 75 in a direction to anticipate that the corrective action will cause the belt to shift back toward its proper trained position passing across the central portion of the bend pulley 10. In other words, with the control point positioned so that switch 75 senses the edge of belt B as being disposed in one direction from a predetermined relation between the control point and belt edge at change over of switch 75, the motor 35 causes corrective action to shift the belt edge toward return of the belt edge to this predetermined relation to the control point and at the same time causes movement of the control point itself toward this predetermined relation. When switch 75 senses the control point as being disposed in the opposite direction from this predetermined relation, the switch 75 is in its opposite actuated condition and motor 35 is running in a reverse direction to apply corrective action to move the belt edge toward this predetermined relation and at the same time move the control point itself toward this predetermined relation.

While the anticipating movements of switch 75 avoid applying over correction as could result by continuously swinging the bend pulley axis after a shift of the belt edge has been detected, the mobility of switch 75 prevents it from establishing a fixed relationship between its control point and the theoretically ideal trained position for the edge of belt B relative to pulley 10. Therefore, switch 90 is stationarily mounted adjacent the edge of belt B at a position such that its operator 91 will operate the switch between its two actuated conditions when a predetermined relationship between the edge of belt B and switch 90 occurs. Thus switch 90, in effect, defines what may be termed a centering point, such that when the edge of belt B is sensed to be in one direction from this predetermined relationship between the edge and the centering point, switch 90 will be in one actuated condition and when the belt edge is sensed to be in the opposite direction from this predetermined relationship, switch 90 will be in its other actuated condition.

As previously pointed out, the respective actuated conditions of switch 90 control the direction of rotation of motor 55. This motor, through the gears 50 and 51 and differential 45 also can impart rotation to sprocket 62 through chain 61, sprocket 60 and shaft 46. Referring to FIGURE 1 and assuming for the moment that motor 35 is stationary, when the centering point defined by switch 90 is to the left of the predetermined relationship between the belt edge and the centering switch for change over of switch 90, the condition of switch 90 will be such as to energize motor 55 in a direction to rotate sprocket 62 so as to move switch 75 on rod 70 leftwardly. On the other hand, when the centering point of switch 90 is disposed to the right of this predetermined relationship motor 55 will be driven in a direction to move switch 75 rightwardly.

In actual operation both motors 35 and 55 are always operating in one direction or the other except for the instant of switch over when the switches 75 and 90 change from one actuated condition to the other. Thus, the rotative inputs from motors 35 and 55 applied to rotate sprocket 62 are combined in differential 45 with the total rotation rate imparted to sprocket 62 reflecting either a summation or a difference between the rotational inputs depending upon the direction of rotation of each of these rotational inputs. In practice, the effect of motor 55 on the rotational speed of sprocket 62 may amount to a relatively small percentage of the rotative movement imparted to sprocket 62 by motor 35. For example, motor 55 may effect an increase or decrease in the rotative speed of sprocket 62 amounting to between 10% and 20% of the sprocket rotation caused by motor 35. Thus the rate of movement of switch 75 will be increased or decreased only a minor amount, i.e., a 10% to 20% increase or decrease, by reversing the operation of motor 55 while motor 35 is running.

The combined objective of operation of motors 35 and 55 is to control belt training and the method of training may best be described by reference to the hereinabove referred to movable control point defined by switch 75 and stationary centering point defined by switch 90. In effect, these switches sense the relationship that the edge of belt B has to the control point and the centering point respectively. If it be assumed that the belt is properly trained across the bend pulley 10 when the centering point and edge of the belt B coincide then the coincidence condition represents the predetermined relationship between the belt edge and centering point at which change over of switch 90 and reversal of motor 55 occurs. At the instant of coincidence switch 90 is changing between actuated conditions to effect reversal in the driving direction of motor 55. Likewise if it be assumed that when the movable control point defined by switch 75 coincides with the edge of belt B, this coincidence condition represents the predetermined relation between the belt edge and control point at which changeover of switch 75 occurs then motor 35, at the instant of coincidence is reversed in its direction of rotation.

With these assumptions of coincidence for the relation of the belt edge to both the centering point and the control point at changeover of switches 90 and 75, respectively, and with reference to FIGURE 1, when switch 90 senses the centering point as being to the left of the edge of belt B, motor 55 drives in a direction to shift the control point of switch 75 leftwardly. If, at this time, switch 75 senses the control point as being to the right of the belt edge, motor 35 will be driving screw 15 to swing the axis of pulley 10 counter-clockwise and will also drive sprocket 62 to move switch 75 leftwardly. Thus, a summation effect of the inputs of motors 35 and 55 will be imparted in shifting rod 70 and thereby accelerated leftward movement of switch 75 will occur. A similar accelerating movement of switch 75 will result where switch 90 senses the centering point as being disposed to the right of the edge of belt B while the control point is sensed by switch 75 as being to the left of the belt edge. However, in this latter situation, both of the motors will be operating in directions opposite from that referred to above and switch 75 will be moved at an accelerated rate rightwardly toward the edge of belt B while the corrective action of motor 35 will be swinging the axis of pulley 10 in a clockwise direction. In fact, the accelerated movement of switch 75 will occur at any time that the switches 75 and 90 sense that the control point and centering point are disposed in opposite directions from the edge of the belt. This follows in that with the points so disposed, the corrective action imparted to shaft 11 is contrary to the direction which would appear necessary as determined by the relationship of the centering point to the belt edge and faster movement of the control point so that a minimum period of corrective action will occur, is to be desired.

By the same token, where the switches 75 and 90 sense that both the control point and centering point are disposed in the same direction from the edge of the belt, the directions of rotation of motors 35 and 55 will be such that a slower or decreased rate of movement of switch 75 will occur. This follows since with both points disposed in the same direction from the belt edge both switches sense a mistraining of the belt and the slower movement of the switch 75 will permit motor 35 to impart a greater corrective action in shifting of the axis of pulley 10.

In any event, under the assumptions of coincidence set forth above, the swinging of the pulley axis as caused by operation of motor 35 is terminated when the control point coincides with the belt edge and the movement of the control point is terminated with the control point and centering point both coinciding with the belt edge. As will be appreciated, this is only momentary termination since the switches 75 and 90 more to their opposite actuated condition when the respective control and centering points pass from coincidence with the edge of the belt.

The belt training control device and training method of the instant invention provide corrective shifting of the bend pulley axis, such shifting occurring in one direction or the other in response to sensing of the relation between the control point and the edge of the moving belt. The corrective action of swinging the pulley axis is accompanied by movement of the control point in a direction to anticipate that the corrective shifting action will result in return of the belt to its proper trained position and thus the control point moves to meet the returning edge of the belt. The movement thus avoids applying excess corrective action. The centering point relationship to the moving belt creates a limited degree of change in the position of the control point aiming at at always returning the control point to a position where it coincides with the centering point and belt edge even though movement of the control point accompanying the corrective swinging action may shift the control point from coincidence with the center point.

An important characteristic and feature of the instant invention relates to the magnitude of corrective action imparted to swing the bend pulley axis. It has been noted hereinabove that the relationship sensed to exist between the centering point and belt edge causes only a minor degree of movement in relation to the degree of movement of the control point accompanying corrective swinging of the pulley axis. Additionally, the amount of corrective swinging action for each cycle of belt travel, a cycle being represented by the full belt length passing once across the bend pulley, should be relatively small. If substantial swinging movement is imparted to the bend pulley axis during each cycle, over correction can result with the belt walking or shifting off one end of the bend pulley. Where limited corrective action is applied for each cycle, if the belt over a series of cycles tends to migrate toward one end of the bend pulley, the cumulative effect of the corrective action for the successive cycles tending to return it from such migrated position to the proper trained position will swing the bend pulley axis in a direction such that the belt will progress back to its proper trained position during the following cycles of belt movement.

Many variations and modifications of the present invention will occur to those skilled in the art from a study of the invention modification specifically disclosed herein. All such variations and modifications which come within the spirit and scope of the appended claims are intended to be included herein as fully and completely

I claim:

1. A device for maintaining a band belt trained over the central portion of the bend pulley in a belt conveyor system having means at one end of the bend pulley shaft for swinging the shaft axis of the pulley in a plane generally parallel to the supporting surface of the belt, said device comprising first reversible drive means coupled to swing the bend pulley axis and thereby cause lateral shifting of the belt on the bend pulley, first sensing means operable between two actuated conditions by lateral shifting of the belt on the bend pulley, said sensing means being connected to operate said drive means in one direction when in one actuated condition and operate said drive means in the opposite direction when in the other actuated condition, movable mounting means carrying said sensing means to move said sensing means relative to the edge of the belt, said drive means being coupled to move said mounting means opposite to the direction of lateral shifting of the belt caused by said drive means swinging the bend pulley axis, second reversible drive means coupled to cooperate with said first drive means in moving said mounting means and second sensing means fixedly mounted to be operable between two actuated conditions by lateral shifting of the belt on the bend pulley, said second sensing means being connected to operate said second drive means in one direction when in one actuated condition and operate said second drive means in the opposite direction when in the other actuated condition.

2. A device as recited in claim 1 wherein said drive means are electric motors and said sensing means are switches connected in circuits to control energization of said motors.

3. A device for maintaining a band belt trained over the central portion of the bend pulley in a belt conveyor system having means at one end of the bend pulley shaft for swinging the shaft axis of the pulley in a plane generally parallel to the supporting surface of the belt, said device comprising a first reversible motor connected to swing the bend pulley axis and thereby cause lateral shifting of the belt on the bend pulley, a movably mounted member carrying a first switch to be movable in a path extending generally parallel to the supporting surface of the belt, said first switch being operable between two actuated conditions by lateral shifting of the belt on the bend pulley and being connected to operate said motor in one direction when in one actuated condition and operate said motor in the opposite direction when in the other actuated condition, said motor being connected to move said member opposite to the direction of lateral shifting of the belt caused by said motor swinging the bend pulley axis, a second reversible motor connected to cooperate with said first motor in moving said member, and a second switch fixedly mounted to be operable between two actuated conditions by lateral shifting of the belt on the bend pulley, said second switch being connected to operate said second motor in one direction when in one actuated condition and operate said second motor in the opposite direction when in the other actuated condition.

4. A device for maintaining a band belt trained over the central portion of the bend pulley in a belt conveyor system having means at one end of the bend pulley shaft for swinging the shaft axis of the pulley in a plane generally parallel to the supporting surface of the belt, said device comprising a first reversible motor connected to swing the bend pulley axis and thereby cause lateral shifting of the belt on the bend pulley, a movably mounted member carrying a switch to be movable in a path extending laterally of the supporting surface of the belt, said switch being operable between two actuated conditions by lateral shifting of the belt on the bend pulley and being connected to operate said motor in one direction when in one actuated condition and operate said motor in the opposite direction when in the other actuated condition, gear means including a differential connecting said motor to move said member opposite to the direction of lateral shifting of the belt caused by said motor swinging the bend pulley axis, a second reversible motor connected to said differential to cooperate with said first motor in moving said member, and a second switch fixedly mounted to be operable between two actuated conditions by lateral shifting of the belt on the bend pulley, said second switch being connected to operate said second motor in one direction when in one actuated condition and operate said second motor in the opposite direction when in the other actuated condition.

References Cited by the Examiner

UNITED STATES PATENTS

| 2,346,765 | 4/44 | Kratz | 74—241 X |
| 2,600,273 | 6/52 | Seifried | 74—241 |
| 2,783,871 | 3/57 | Sowards | 74—241 X |

FOREIGN PATENTS

| 410,859 | 5/34 | Great Britain. |

SAMUEL F. COLEMAN, *Primary Examiner.*

JULIUS E. WEST, ERNEST A. FALLER, JR.,
*Examiners.*